United States Patent [19]

Karelitz

[11] Patent Number: 4,653,843
[45] Date of Patent: Mar. 31, 1987

[54] IMAGE PRODUCING DEVICE

[76] Inventor: Judith Karelitz, 430 E. 86th St., New York, N.Y. 10028

[21] Appl. No.: 776,006

[22] Filed: Sep. 13, 1985

[51] Int. Cl.⁴ .............................................. G02B 23/00
[52] U.S. Cl. ......................................... 350/4.2; 353/2
[58] Field of Search ...................... 350/4.1, 4.2; 353/2

[56] References Cited

U.S. PATENT DOCUMENTS

| | | | |
|---|---|---|---|
| 2,423,371 | 7/1947 | Carranza | 350/4.2 |
| 3,100,418 | 8/1963 | Posner | 350/4.2 |
| 3,383,150 | 5/1968 | Powers | 350/4.2 |
| 3,674,333 | 7/1972 | Mandel | 350/4.2 |
| 3,841,730 | 10/1974 | Karelitz | 350/4.2 |

Primary Examiner—Richard A. Wintercorn
Attorney, Agent, or Firm—Cohen, Pontani & Lieberman

[57] ABSTRACT

An amusement device for producing a variety of unusual changing images and colors comprising a tube having an interior reflecting surface extending substantially the entire length thereof. An object case at one end of the member contains one or more birefringent objects of varying size and shape. An eye piece is disposed at the other end of the chamber. Light polarizers are disposed on both sides of the birefringent objects. At least one of the light polarizers is dimensioned so that it is free to rotate within the tube when the tube is tapped, shaken or turned.

15 Claims, 10 Drawing Figures

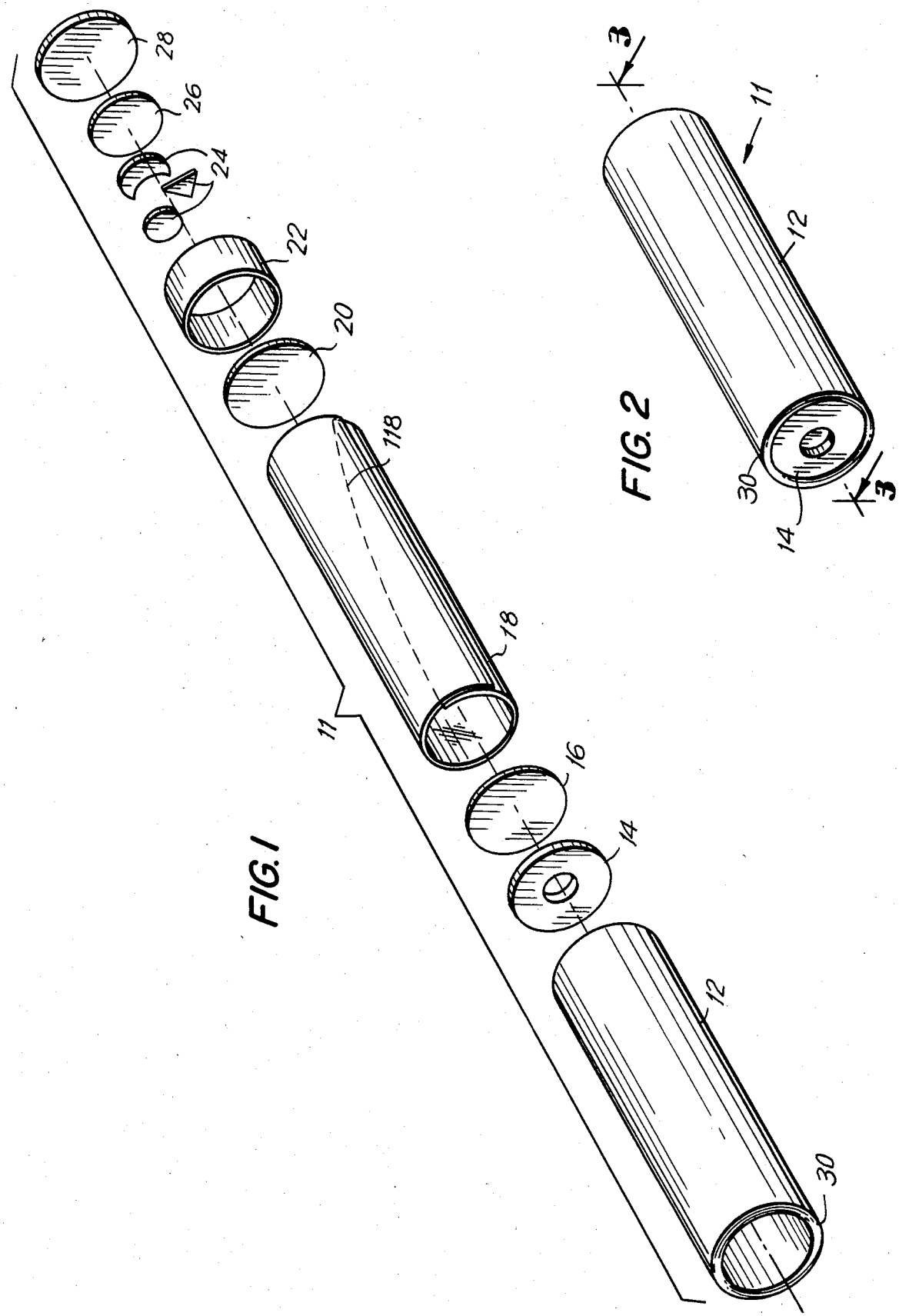

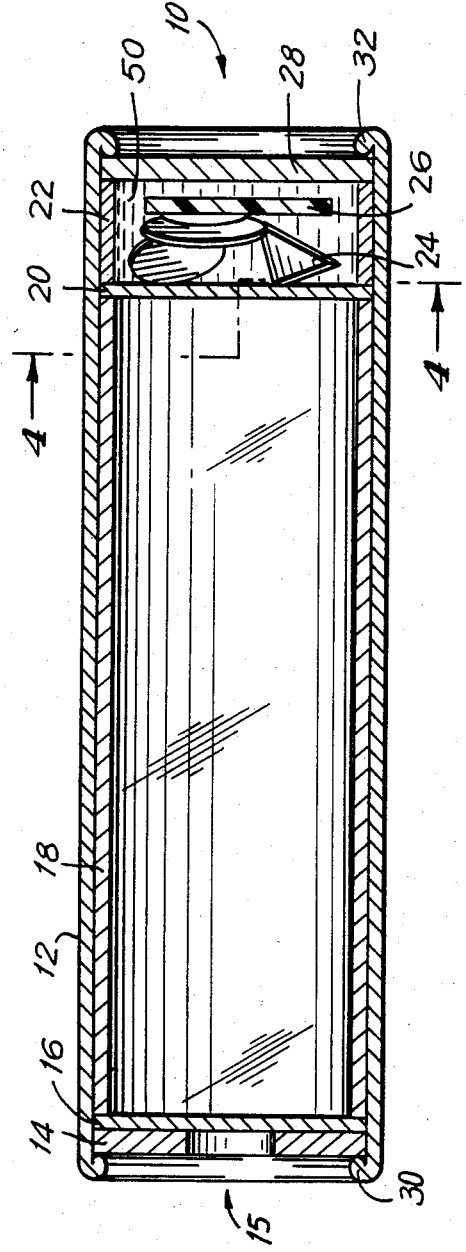
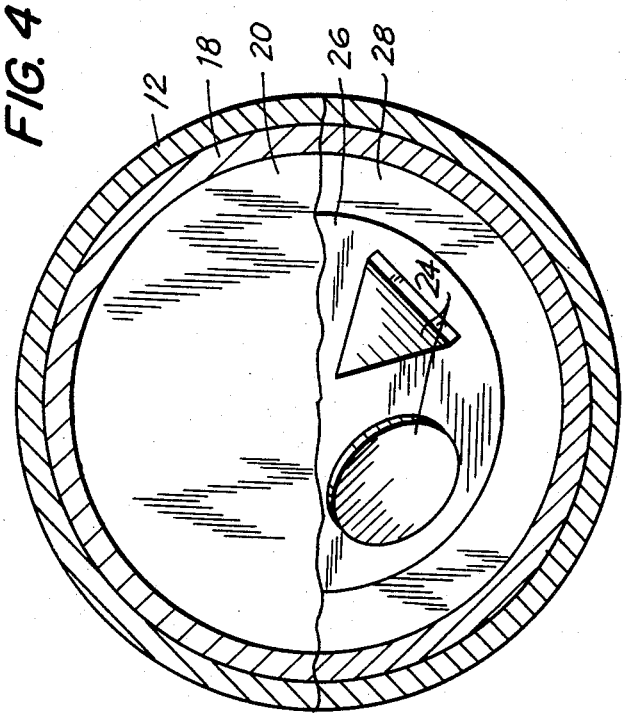
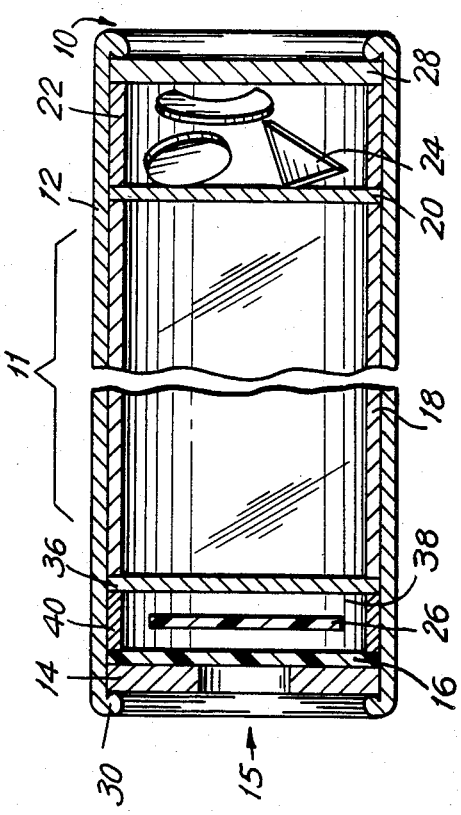

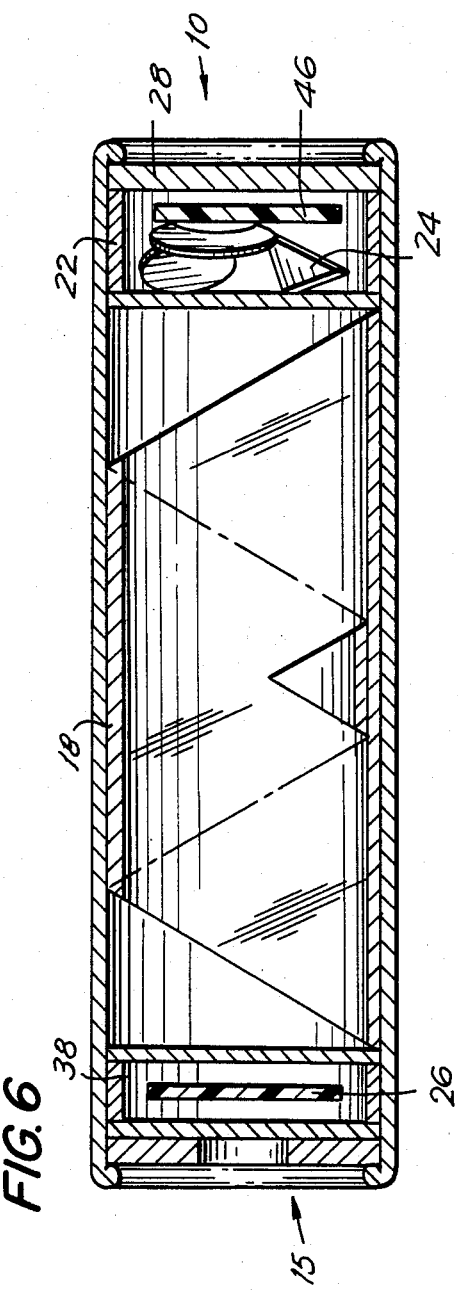
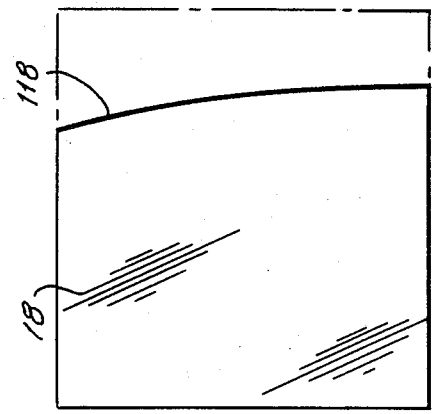
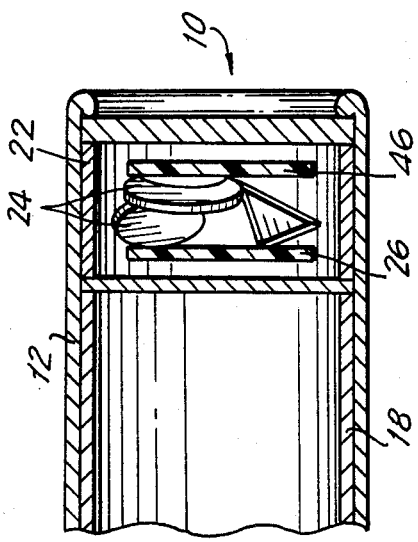

IMAGE PRODUCING DEVICE

TECHNICAL FIELD

The invention pertains to an amusement device in which a substantially infinite variety of changing images and colors may be produced by projecting light through an opening therein. As used herein, the term "light" shall include any form of light, whether steady or varying, whether focused or diffused, whether or not in the form of an image, so long as not substantially of one frequency such as produced by a laser.

BACKGROUND ART

Image producing devices such as kaleidoscopes are well known in the art. Kaleidoscopes are all basically similar in that they have an eyepiece at one end of a hollow tube, longitudinally extending planar mirrors angularly disposed within the tube, and an object case at the other end of the tube. The objects are usually colorful, of a wide variety of shapes, and transparent, although they are sometimes translucent and, less frequently, opaque. Generally, the eyepiece, the viewing end, is opaque with a transparent hole or viewing means while the outward facing end of the object case, the light receiving end, is translucent. The objects within the object case are illuminated by aiming the device at a source of light such as a lamp or bright window. Many variations and refinements of this basic device have been developed, including the expedient of suspending the objects in a clear liquid medium and the provision of self-contained illumination sources. The devices described in U.S. Pat. No. 3,383,150 issued to E. A. Powers are typical.

Also known in the art are image producing devices characterized by a tube having an arcuate internal reflecting surface rather than angularly related planar mirrors. Like kaleidoscopes, these devices may contain a plurality of objects of varying size, color and shape within a light transmitting object enclosure.

It has also been proposed that such devices contain two polarizing sheets having birefringent material therebetween. The two polarizers are fixed to two tubular parts which are mounted for relative rotation. Rotation of the tubular parts results in rotation of the polarizing sheets which in turn causes the color of the light transmitted through the birefringent material to change. One such device is disclosed in U.S. Pat. No. 3,841,730 which is incorporated herein by reference. Such a prior art device is expensive to produce being very labor intensive.

SUMMARY OF THE INVENTION

The image producing device of the present invention comprises an elongated internally transparent member, such as a tube, having an interior reflecting means extending substantially the entire length thereof, an object case at one end containing one or more birefringent objects which may be of varying size, shape, and color, light transmitting means at one end of said elongated member, and viewing means or eye piece at the other end of said elongated member.

The object case freely transmits light through it. Polarizing means are provided in at least two places, one between the light transmitting means and the birefringent objects, the other between the birefringent objects and the eye piece. At least one of these polarizing means is of such a size and shape, that it can rotate freely within the internally transparent member.

The interior reflecting means, which may be in any of a number of different forms, some of which will be described in detail herein, produces unusual optical effects. If the internally transparent member is a tube, the casing of the tube may be composed of any suitable opaque, translucent or transparent material, e.g., cardboard, metal, glass, Plexiglas, and the like. Any suitable means for achieving internal reflection can be employed, such as polishing, coating, or lining the inner surface of the device with a sheet of reflective material or by mounting angularly related mirrors as in a traditional kaleidoscope. While the internally transparent member is usually hollow, e.g. a tube, it may be a solid of suitable transparent material, such as a column of Plexiglas. In another embodiment, the member may be hollow but filled with a transparent liquid such as water or mineral oil.

The simplified construction of the present invention makes it less expensive to produce than known polarized image producing devices. Further features and advantages of the image producing device in accordance with the present invention will be more fully apparent from the following detailed description and annexed drawings of the presently preferred embodiments thereof.

BRIEF DESCRIPTION OF THE DRAWINGS

FIG. 1 is an exploded perspective view of one form of the device in accordance with the present invention;

FIG. 2 is a perspective view of the device of FIG. 1;

FIG. 3 is a sectional view taken along lines 3—3 of FIG. 2;

FIG. 4 is a sectional view taken along lines 4—4 of FIG. 3;

FIG. 5 is a fragmentary sectional view illustrating an alternative placement of the freely rotatable polarizer;

FIG. 6 is a sectional view illustrating an alternative embodiment with two freely rotatable polarizers;

FIG. 7 is a fragmentary sectional view illustrating another alternative placement of two freely rotatable polarizers;

FIG. 9 is a plan view illustrating an unrolled reflective sheet; and

DESCRIPTION OF THE PREFERRED EMBODIMENTS

Figure 8:
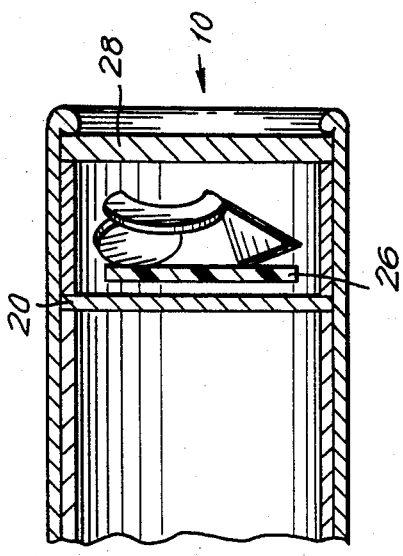
FIG. 8 is a fragmentary sectional view illustrating another alternative placement of a freely rotatable polarizer.

Referring to FIGS. 1-3, the amusement device 11 includes an elongated hollow cylinder or tube 12. While tube 12 is shown to be circular in cross-section, other cross-sections will be satisfactory, such as, for example, an oval cross-section. A light transmissive first disc 16 is disposed in one end of the tube 12 and therewith comprises the viewing means or eye piece 15. Alternatively, viewing means 15 may comprise a ring 14, that is a disc with a hole in it, or a combination of disc 16 and ring 14. The first disc 16 is preferably transparent though, as explained below, first disc 16 may also be a light polarizer and/or a lens. If desired, disc 16 may be partially translucent and partially transparent; it may also be perforated if desired. A light transmissive second disc 28 is disposed at the other end of tube 12. Second disc 28, which is transparent or translucent and maybe perforate or imperforate, forms the light transmitting means 10 at the end of the device 11 opposite the eye piece 15. Alternatively, light transmitting means 10 may be the opening at the end of the tube 12 or an opening in a disc at the end of the tube or anything else which permits the passage of light into tube 12. In alternative embodiments, second disc 28 may be a light polarizer. Between first disc 16 and second disc 28 but close to disc 28 is a third disc 20 which, together with second disc 28 forms an object case 22. Internal reflecting means 18 preferably extend substantially the entire length of tube 12 between the object case and the eye piece.

In the device 11 shown in FIGS. 1 and 3, third disc 20 is composed of a light polarizing material. The object case 22 is positioned between and defined by third disc 20 and second disc 28. Object case 22 is of sufficient length and accommodates one or more objects 24 of varying size and shape preferably such that the objects may move freely therein. At least one of the objects 24 is composed of birefringent material. Preferably, a plurality and most preferably all of said objects are birefringent. The birefringent objects may be made of a number of materials exhibiting birefringency, such as, for example, mica or cellophane.

In FIGS. 1 and 3, a polarizer 26 is disposed within the object case 22 such that the objects 24 lie between the polarizer 26 and third disc 20. The polarizer 26 is dimensioned relative to tube 12 for free rotation within object case 22 but is sufficiently large to trap the objects 24 between the polarizer 26 and third disc 20. At a minimum, the crosswise dimension (e.g. diameter) of polarizer 26 is greater than the spacing between discs 20 and 28. The polarizer 26 is preferably, though not necessarily, circular.

In use, the light transmissive end 10 of device 11 is aimed at a source of light (not shown). If desired, the light source may be mounted on or associated with the device 11 to provide a self-contained light source, which, in use, would be located externally of second disc 28. Light from the light source passes through polarizer 26, objects 24, and third disc 20 (in this embodiment, a light polarizer). At least some of the light is then subjected to reflection off internal reflecting means 18 and then passes through first disc 16 (in this embodiment, a transparent disc) whereupon it is viewed.

Rotating, shaking, or tapping tube 12 causes polarizer 26 which is undersized relative to the internal diameter of tube 12, to rotate with respect to third disc 20 (in this embodiment a light polarizer) and also causes birefringent objects 24 to move about within object case 22. A substantially infinite variety of patterns of objects and color effects are thereby produced. The pattern and color are varied by movement of objects 24 and color is varied by rotation of polarizer 26 relative to polarizing second disc 28. These patterns and effects are intensified by reflecting means 18 and viewed through viewing means 15. Further rotating, shaking, or tapping the device causes further movement of the objects 24 and polarizer 26 within object case 22, thereby further changing the pattern or array of objects and the spectrum of colors of the light passing through them. As can be appreciated, if object case 22 is filled with a liquid 50 (FIG. 3), such as mineral oil, the movement of objects 24 and polarizer 26 would be more gradual and therefore longer lasting than if the object case 22 contained air.

The invention therefore provides for rotation of one polarizer with respect to the other without the need of any moving parts other than by virtue of the dimensioning of the polarizer 26 itself. Known image producing devices which use polarizers to create changing color effects require up to five tubes in order to provide for relative rotation of the polarizers. For example, a connecting tube may be employed and inserted within other tubes to two of which a polarizer has been fixedly mounted. The tubes with polarizer can then be rotated relative to each other, thus causing the polarizers to rotate with respect to each other to produce the desired optical effects. In the present invention, only one tube is needed, the relative rotation of the polarizers being achieved by the dimensioning of one of them for movability relative to the tube and to the other polarizer. The construction of the present invention is therefore much simpler and less expensive than that of prior art devices.

Discs 16, 20 and 28 may be mounted within tube 12 in any conventional way. For example, gluing, or they may have a diameter substantially equal to the tube 12, thus insuring a tight fit without gluing. Viewing means 15 usually, but not necessarily, includes a ring 14 to narrow the angle of viewing and vary the aperture.

Tube 12 can be fabricated of any suitable material, which material may be opaque, translucent or fully transparent, as desired. For example, cardboard, metal or rigid plastic such as Plexiglas may be employed. Preferably, the exterior of the cylinder is opaque. As illustrated, tube 12 is a cardboard tube, laminated on the exterior and having lips 30, 32 of reduced diameter formed by crimping the ends of tube 12 which serve as abutments to confine the endmost discs 16 and 28.

In the preferred embodiment, the reflecting means 18 of tube 12 is achieved by lining the interior of tube 12 with a film of highly reflective material, for example, a sheet of metallized Mylar. However, any suitable reflective film may be employed. In lieu of a reflective lining, the interior of tube 11 may be coated with reflective material or conventional kaleidoscope prism made up of angularly disposed reflectors may be positioned within the tube. As shown in FIG. 1, the reflecting means 18 is a film sheet formed into a tube having a diameter approximately equal to the internal diameter of the tube 12. In the preferred embodiment the film sheet is trapezoidal or nearly so, as shown in FIG. 9 where edge 118 is slightly convex, such that when it is rolled into a tube 18, as shown in FIG. 1, the inside edge 118 spirals along the reflecting inner surface. This is a particularly simple and effective means for providing a spiral internal reflecting means. A rectangular sheet of reflective material 18 having a length approximately equal to the length of tube 12 and a width greater than the internal circumference of tube 12, is cut along its length in a straight or curved line 118 such that its width decreases from one end having a maximum width greater than the inner circumference of tube 12 and the other end having a minimum width equal to the inner circumference of the tube 12. The sheet is then rolled into a cylinder with its cut edge 118 exposed on the inside surface of the cylinder and the cylinder is then inserted into tube 12. This forms a self-supporting reflective inner lining with a spiral edge which will be biased against the inner wall of tube 12.

Alternatively, as shown in FIG. 6, the reflecting means 18 may be spirally wound on the interior wall of tube 12, whereby adjacent convolutions overlap at least a portion of the previous turn and are in turn telescoped within the next successive turn. This is also a particularly simple and effective means for providing the internal reflecting means in that it can be achieved by wrapping a sheet of reflective material which is somewhat shorter than the tube 12 around a core, laterally separating the ends of the wrapped sheet to a length slightly in excess of that of the tube 12, cutting off the ends of the wrapped sheet to achieve substantially the same length as that of the tube 12, and inserting the sheet within the tube 12. The sheet will thus form a self-supporting reflective lining which will be biased against the inner wall of the tube 12. Moreover, the optical effect of the spirally wound reflective sheet is startling and highly pleasant to the eye. Alternatively, the internal reflecting can be achieved by employing a tube of Plexiglas which has a highly reflective inner surface. These alternatives all yield unique optical effects.

Construction of the preferred embodiment is accomplished by inserting the parts within the tube 12. Disc 16 and ring 14 are press fit into one end of the tube 12 and are positioned by lip 30. Reflecting means 18 in the form of a reflective sheet is inserted and abuts disc 16. The object case 22 is defined by disc 20 and disc 28 is press fit into the other end of tube 12. Lip 32 abuts disc 28.

As shown in the Figures, the object case 22 is a cylindrical tube preferably having an outer diameter equal to the inner diameter of tube 12 and an inner diameter larger than the inner diameter of reflecting means 18 and accordingly, when positioned inside tube 12 a tight fit is achieved, eliminating the need for any adhesive. However, any suitable means for defining this enclosure could be used. Preferably, the inner diameter of object case 22 should be larger than the inner diameter of reflecting means 18 so no outline of the edge of object case 22 is visible.

The object or objects 24 in object case 22 may be of various shapes, either regular or irregular and may even be spheres. At least one of the objects must be birefringent.

Discs 16, 20 may be composed of any suitable transparent material, and may be colored. Disc 16 needs to be transparent only in its central area for viewing. Any of the discs 16, 20, 28, 36 may be lenses, for example, magnifying lenses or condensing lenses. Either disc 16 or 20 may be composed of light-polarizing material, but preferably not both, although they both may be polarizing if desired. It is only necessary that there be one polarizer between the light source and the birefringent objects and one polarizer between the viewing means and the birefringent objects. The invention calls for at least one of the polarizers to be mounted and dimensioned so that it is freely rotatable by shaking, tapping or rotating tube 12. In the embodiment illustrated in FIG. 1-3, first disc 16 is composed of a sheet of clear plastic, while third disc 20 is a polarizer. Polarizer 26 is contained within the object case 22 with the objects 24 between it and polarizing third disc 20. Thus, the birefringent material is sandwiched between two sheets of polarizing material, this arrangement producing interesting and varied color effects.

An alternative embodiment is shown in FIG. 5. In this embodiment, third disc 20 is preferably non-polarizing, but may be a polarizer as discussed below. Second disc 28 is a polarizer and first disc 16 is preferably non-polarizing. Polarizer 26 is placed within a second containing enclosure or case 38. In this embodiment, as is required, the birefringent objects are placed between two polarizers, one of the polarizers 26 being rotatable relative to non-rotatable polarizer 28 and similar changing color effects are thus created. Second case 38 is shown to be formed in the same manner as object case 22, that is by first disc 16, annular tube 40 and fourth disc 36. The dimensions of second case 38 need only be sufficient to allow free rotation of polarizer 26 as tube 12 is tapped, turned or shaken. If third disc 20 is also a polarizer, it is preferably aligned to polarize light in the same direction as the polarizer of second disc 28. When both discs 20 and 28 are polarizers in this embodiment (i.e. with rotatable polarizer 26 located in second case 38) extended wavelengths of color are achieved.

A further alternative embodiment is shown in FIG. 6 which is similar to the embodiment shown in FIG. 5. However, in the embodiment of FIG. 6, second disc 28 is non-polarizing and a second rotatable polarizer 46 is placed within the object case 22 as originally shown in FIG. 3. As is true of polarizer 26, the polarizer 46 between the light source (not shown) and the objects 24 is freely rotatable by virtue of its dimensioning. This embodiment provides for more rapid rotation of the polarizers with respect to each other, and thus the changing colors are achieved with minimal rotating, shaking, or tapping of tube 12. The rapidity of relative rotation between polarizers may be further enhanced by dimensioning them with different diameters. Alternatively, both polarizers 26 and 46 may be placed in object case 22 as shown in FIG. 7.

A further alternative placement of the polarizer 26 is shown in FIG. 8. In FIG. 8 third disc 28 is a light polarizer and polarizer 26 is placed within object case 22. However, in this embodiment, polarizer 26 lies between objects 24 and second disc 20.

Figure 10:
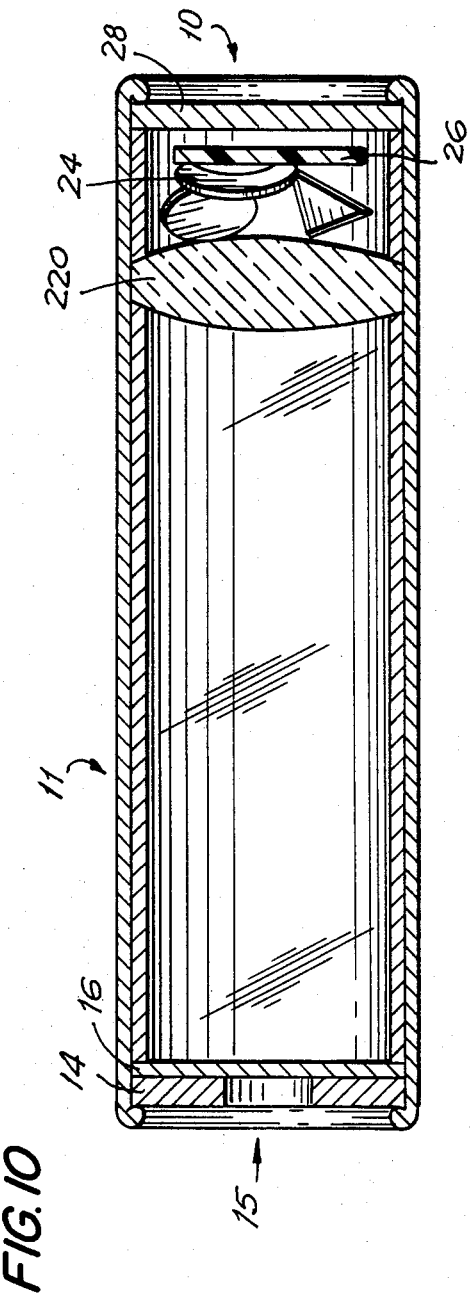
FIG. 10 is a sectional view illustrating an alternative embodiment incorporating a lens.

A fifth alternative embodiment is shown in FIG. 10. In this embodiment disc 20 may be replaced by a lens 220. The object case 22, as such, may be omitted. The objects 24 reside between lens 220 and second disc 28. This embodiment is similar to that shown in FIG. 3. A freely rotatable polarizer 26 is placed between objects 24 and second disc 28. Second disc 28 is non-polarizing and may be either transparent or translucent. First disc 16 located at the eye piece 15 is a polarizer. Thus, birefringent objects 24 reside between two polarizers 16 and 26; and at least one polarizer is dimensioned for free rotation. The use of spherical lens 220 creates additional interesting optical effects by distorting the images viewed through the eye piece 15.

While I have herein shown and described the preferred embodiment of the invention and various modifications thereof, persons of ordinary skill in the art will recognize that other changes and modifications may be made therein without departing from the spirit and scope of the invention. Accordingly, the above description should be construed as illustrative, and not in a limiting sense, the scope of the invention being defined by the following claims.

I claim:

1. An image producing device comprising an elongated light transmitting member having means for causing interior reflection extending substantially the entire length thereof;

light transmitting means at one end of the elongated member in light transmitting communication with the interior reflecting means;

viewing means at the other end of the elongated member communicating with the reflecting means;

object containing means placed at one end of said elongated member between the light transmitting means and the viewing means and in light transmitting communication therewith, at least one object disposed within said object containing means and being comprised of birefringent material, a first light polarizing means located between said object and the light transmitting means and a second light polarizing means being located between said object and the viewing means;

one of said polarizing means having dimensions such that it may rotate freely about its central axis relative to said elongated member, whereby said freely rotatable polarizing means may be rotated relative to the other by tapping, turning or shaking said elongated member to produce color changes.

2. An image producing device as claimed in claim 1, wherein said elongated light transmitting member is a tube, said object containing means is disposed adjacent one end of said tube, and said viewing means is disposed adjacent the other end thereof.

3. An image producing device as claimed in claim 1, wherein the other of said polarizing means has dimensions such that it may rotate freely about its central axis relative to said elongated hollow member.

4. An image producing device as claimed in claim 2, wherein the other of said polarizing means has dimensions such that it may rotate freely about its central axis relative to said elongated hollow member.

5. An image producing device as claimed in claim 1, wherein said freely rotatable polarizing means is located within the object containing means.

6. An image producing device as claimed in claim 2, further comprising second containing means placed within the tube between the viewing means and the object containing means, said freely rotatable polarizing means being located within said second containing means.

7. An image producing device as claimed in claim 3, wherein both said first and second polarizing means are located within the object containing means.

8. An image producing device as claimed in claim 4, further comprising second containing means placed within the tube between the viewing means and the object containing means, wherein one of said polarizing means is located within the object containing means and the other of said polarizing means is located within the second containing means.

9. An image producing device as claimed in claim 2, wherein the internal means for causing interior reflection comprises a spirally wound reflective sheet.

10. An image producing device as claimed in claim 9, wherein said reflective sheet has a substantially trapezoidal shape when unrolled, the inner edge of said sheet when rolled into a reflective cylinder forming a spiral.

11. An image producing device as claimed in claim 1, wherein said object containing means is filled with a clear liquid medium.

12. An image producing device as in claim 1, further comprising a lens, said lens being located between said light transmitting means and said viewing means.

13. An image producing device as claimed in claim 5, wherein the diameter of said freely rotatable polarizing means is greater than the length of the object containing means.

14. An image producing device as claimed in claim 6, wherein the diameter of said freely rotatable polarizing means is greater than the length of said second containing means.

15. An image producing device as claimed in claim 7, wherein the diameter of said freely rotatable polarizing means is greater than the length of the object containing means.

* * * * *